United States Patent
Chatterji et al.

(10) Patent No.: US 6,308,777 B2
(45) Date of Patent: *Oct. 30, 2001

(54) CEMENTING WELLS WITH CRACK AND SHATTER RESISTANT CEMENT

(75) Inventors: Jiten Chatterji, Duncan; Roger S. Cromwell, Walters; Ronald J. Crook; Frank Zamora, both of Duncan, all of OK (US)

(73) Assignee: Halliburton Energy Services, Inc., Duncan, OK (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/417,551

(22) Filed: Oct. 13, 1999

(51) Int. Cl.$^7$ .................................................. E21B 33/14
(52) U.S. Cl. ................................. 166/293; 106/711
(58) Field of Search ....................... 166/292–295; 106/711

(56) References Cited

U.S. PATENT DOCUMENTS

| | | | |
|---|---|---|---|
| 3,363,689 | 1/1968 | Smith et al. | 166/29 |
| 3,774,683 | 11/1973 | Smith et al. | 166/293 |
| 4,306,911 | * 12/1981 | Gordon et al. | 106/99 |
| 4,927,462 | 5/1990 | Sugama | 106/99 |
| 5,399,195 | * 3/1995 | Hansen et al. | 106/711 |
| 5,421,409 | * 6/1995 | Mueller et al. | 166/292 |
| 5,820,670 | 10/1998 | Chatterji et al. | 106/727 |
| 6,016,872 | 1/2000 | Davis | 166/312 |
| 6,059,035 | 5/2000 | Chatterji et al. | 166/293 |
| 6,059,036 | 5/2000 | Chatterji et al. | 166/294 |

FOREIGN PATENT DOCUMENTS

| | | |
|---|---|---|
| 1239255B | 6/1966 | (DE) . |
| 0 867 495 A2 | 9/1998 | (EP) . |

OTHER PUBLICATIONS

Brochure entitled "FORTA®" published by the Forta Corporation of Grove City, Pennsylvania, (Not dated).
Halliburton Energy Services Cementing Technical Data Sheet entitled: Tuf Cement Composition, (Not dated).
Smith, Dwight K., *Cementing*, Second Printing, 1990, pp. 34–37.
Dan Mueller, *An Evaluation Of Well Cements For Use In High Stress Environments*, Apr. 1998, pp. 91–93, XP–000793073.
Patent Abstracts of Japan, *Fiber For Reinforcing Concrete And Concrete Formed Product Using The Same*, Publication Number 11189448, published Jul. 13, 1999.
Database WPI Derwent Publications, Ltd., XP–002162286, 1998.
Database WPI Derwent Publications, Ltd., XP–002162287, 1984.

* cited by examiner

*Primary Examiner*—William Neuder
*Assistant Examiner*—Zakiya Walker
(74) *Attorney, Agent, or Firm*—Craig W. Roddy; C. Clark Dougherty, Jr.

(57) ABSTRACT

Improved cement compositions and methods of cementing subterranean zones penetrated by well bores are provided. In accordance with the methods, a crack and shatter resistant cement composition is introduced into a subterranean zone by way of the well bore penetrating it comprised of a hydraulic cement, sufficient hydrophilic fibers to make the cement composition crack and shatter resistant upon setting and sufficient water to form a pumpable slurry. Thereafter, the cement composition is allowed to set in the subterranean zone.

9 Claims, No Drawings

CEMENTING WELLS WITH CRACK AND SHATTER RESISTANT CEMENT

BACKGROUND OF THE INVENTION

1. Field of the Invention

The present invention relates generally to cementing subterranean zones penetrated by well bores, and more particularly, to such methods whereby cement compositions which are crack and shatter resistant are utilized.

2. Descrintion of the Prior Art

Hydraulic cement compositions are commonly utilized in subterranean well completion and remedial operations. For example, hydraulic cement compositions are used in primary cementing operations whereby pipe strings such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space thereby forming an annular sheath of hard substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

Multi-lateral wells have recently been developed which include vertical or deviated principal well bores having one or more ancillary laterally extending well bores connected thereto. Drilling and completion equipment is available which allows multiple laterals to be drilled from a principal cased and cemented well bore. Each of the lateral well bores can include a liner cemented therein which is tied into the principal well bore. The lateral well bores can be drilled into predetermined producingformations or zones at any time in the productive life cycle of the well.

In both conventional wells having single well bores and multi-lateral wells having several bores, the cement compositions utilized for cementing casings or liners in the well bores must have sufficient ductility and toughness to resist cracking or shattering as a result of pipe movements, impacts and/or shocks subsequently generated by drilling and other well operations. Set cement in wells, and particularly, a set cement. Sheath in the annulus between a pipe string and the walls of a well bore often fails by cracking or shattering during perforating and/or drilling operations. When the set cement cracks or shatters, rubble is often produced in the well or annulus.

Various types of fibers have been utilized in construction cement compositions heretofore including fibers formed of glass, steel, graphite, polyesters, polyamides and polyolefins. Polyolefin fibers are generally the most preferred in that they are readily available, are low in cost and have high resistance to corrosion and degradation. Fibrillated net-shaped polyolefin fibers are particularly suitable for use in cement compositions because they resist being pulled out of the set cement. The fibers fimction to control shrinkage cracking in the early stages of the cement setting process, and after setting, the fibers provide ductility and toughness to the cement composition whereby it resists cracking or shattering. When cracking or shattering does occur, the fibers hold the cracked or shattered set cement together and prevent the formation of rubble.

A problem heretofore experienced in the use of fibers in well cement compositions is that the fibers are hydrophobic and are difficult to dry blend with cement. The fibers agglomerate in the dry cement when it is conveyed causing plugging to occur, and when the cement and fibers are combined with mixing water, the fibers form mats which prevent their dispersion into and throughout the cement slurry. The lack of dispersion of the fibers in the cement slurry make it difficult to pump.

Thus, there are needs for improved well cement compositions and methods wherein the cement compositions contain fibrillated fibers which can be easily mixed and conveyed with dry cement and subsequently dispersed in the aqueous cement slurries formed.

SUMMARY OF THE INVENTION

The present invention provides improved cement compositions and methods of cementing a subterranean zone which meet the needs described above and overcome the deficiencies of the prior art. The methods of the invention are basically comprised of the steps of introducing a crack and shatter resistant cement composition into a subterranean zone to be cemented and allowing the cement composition to set therein. The crack and shatter resistant cement compositions utilized in accordance with this invention are basically comprised of a hydraulic cement, sufficient hydrophilic fibers to make the cement composition crack and shatter resistant upon setting and sufficient water to form a pumpable slurry of the cement and fibers. The hydrophilic fibers utilized in accordance with this invention are preferably hydrophilic fibrillated polyolefin fibers.

The methods of this invention are particularly suitable for cementing a pipe string such as casing or a liner in a well bore whereby the set cement can withstand the formation of perforations therein as well as other impacts and shocks subsequently generated by drilling and other well operations without cracking or shattering and forming rubble. Such methods are basically comprised of the following steps. A crack and shatter resistant cement composition of this invention is pumped into the annulus between the pipe string and the walls of the well bore. The cement composition is then allowed to set into a hard crack and shatter resistant impermeable mass having ductility and toughness.

It is, therefore, a general object of the present invention to provide improved cement compositions and methods of cementing subterranean zones penetrated by well bores using the cement compositions.

Other and further objects, features and advantages of the present invention will be readily apparent to those skilled in the art upon a reading of the description of preferred embodiments which follows.

DESCRIPTION Of PREFERRED EMBODIMENTS

The present invention provides improved crack and shatter resistant cement compositions and methods of cementing subterranean zones using the compositions. The improved crack and shatter resistant cement compositions are basically comprised of a hydraulic cement, sufficient hydrophilic fibers to make the cement composition crack and shatter resistant upon setting and sufficient water to form a pumpable slurry of the cement and fibers. The methods are basically comprised of the steps of introducing a crack and shatter resistant cement composition of this invention into the zone by way of the well bore and then allowing the cement composition to set in the zone.

The term "crack and shatter resistant cement composition" is used herein to mean a cement composition that sets into a hard impermeable mass having ductility and toughness and that resists cracking and/or shattering as a result of perforating operations, pipe movements, impacts, shocks and the like. If cracking or shattering does occur, the pieces formed are held together by the hydrophilic fibers in the cement composition.

While the cement compositions and methods of this invention are useful in a variety of well completion and remedial operations, they are particularly useful in primary cementing, i.e., cementing casings and liners in well bores. The crack and shatter resistant cement compositions of this invention are readily and easily prepared without the conveying, mixing, fiber dispersal and pumping problems encountered heretofore.

A variety of hydraulic cements can be utilized in the crack and shatter resistant cement compositions of this invention including those comprised of calcium, aluminum, silicon, oxygen and/or sulfur which set and harden by reaction with water. Such hydraulic cements include Portland cements, pozzolana cements, gypsum cements, high aluminum content cements, silica cements and high alkalinity cements. Portland cements are generally preferred for use in accordance with the present invention. Portland cements of the types defined and described in the *API Specification For Materials And Testing For Well Cements*, API Specification 10, Fifth Edition, dated Jul. 1, 1990 of the American Petroleum Institute are particularly suitable. Preferred API Portland cements include classes A, B, C, G and H, with API classes G and H being the most preferred.

While fibers formed of various materials can be utilized in accordance with the present invention, the fibers utilized must resist degradation in a hydraulic cement composition. For example, fibers formed of polyesters, polyamides and glass suffer from the disadvantage that they degrade in the presence of hydrated lime. Hydrated lime is released in a cement composition as the cement therein is hydrated. Polyolefin fibers are suitable for use in cement compositions in that polyolefin fibers do not degrade or otherwise loose their strength over time in a set cement composition. However, fibers formed from polyolefins are hydrophobic and are very difficult to dry blend with hydraulic cements and disperse in water. Because they are hydrophobic, the polyolefin fibers cluster together when mixed with water and do not disperse therein. When cement slurries containing such non-dispersed fibers are pumped in high pressure pumps, difficulties are encountered due to the fiber clusters plugging off lines, valves and the like.

In accordance with the present invention, hydrophilic polyolefin fibers are included in the crack and shatter resistant cement compositions. The hydrophilic polyolefin fibers do not degrade in cement compositions and are readily dry mixed with cement and dispersed in the cement mixing water. Particularly suitable such hydrophilic polyolefin fibers are commercially available from the Forta Corporation of Grove City, Pa.

The preferred polyolefin fibers are polypropylene or polyethylene fibers which are in a fibrillated net configuration which maximizes the long term durability and toughness of a cement composition including the fibers. The fibrillated net-shaped fibers fimction exceptionally well in preventing cracking or shattering of cement compositions containing them, and if cracking or shattering does occur, in holding the cracked or shattered cement together, i.e., the individual pieces produced are held together by the fibers thereby preventing rubble formation.

The normally hydrophobic polyolefin fibers are converted to hydrophilic fibers by treating the hydrophobic fibers with a surface active agent. The most preferred hydrophilic fibers for use in accordance with the present invention are hydrophilic polypropylene fibrillated net-shaped fibers having lengths in the range of from about 0.5 inch to about 1.5 inches.

Generally, the hydrophilic fibers utilized are included in a cement composition of this invention in an amount in the range of from about 0.1% to about 1% by weight of hydraulic cement in the composition, more preferably in an amount in the range of from about 0.125% to about 0.5%.

The water utilized in the cement compositions of this invention can be fresh water, unsaturated aqueous salt solutions or saturated aqueous salt solutions such as brine or seawater. The water is generally present in the cement compositions in an amount in the range of from about 30% to about 100% by weight of hydraulic cement in the compositions, more preferably in an amount in the range of from about 35% to about 60%.

As will be understood by those skilled in the art, the crack and shatter resistant cement compositions of this invention can include a variety of additives for improving or changing the properties of the cement compositions. Examples of such additives include, but are not limited to, set retarding agents, fluid loss control agents, dispersing agents, set accelerating agents and formation conditioning agents.

Set retarding agents are included in the cement compositions when it is necessary to extend the time in which the cement compositions can be pumped so that they will not thicken or set prior to being placed at a desired location in a well. Examples of set retarding agents which can be used include, but are not limited to, lignosulfonates such as calcium and sodium lignosulfonate, organic acids such as tartaric acid and gluconic acid, copolymers and others. The proper amount of set retarding agent required for particular conditions can be determined by conducting a "thickening time test" for the particular retarder and cement composition. Such tests are described in the API Specification 10 mentioned above. A particularly preferred set retarder for use in accordance with the present invention is a copolymer or copolymer salt of 2-acrylamido-2-methylpropane sulfonic acid and acrylic acid. The copolymer comprises from about 40 to about 60 mole percent 2-acrylamido-2-methylpropane sulfonic acid with the balance comprising acrylic acid, and the copolymer or salt thereof preferably has an average molecular weight below about 5,000. When used, a set retarder is included in the cement composition of this invention in an amount in the range of from about 0.1% to about 2% by weight of hydraulic cement in the composition.

Examples of fluid loss control agents which can be used include, but are not limited to, cellulose derivatives, modified polysaccharides, polyacrylamides, guar gum derivatives, 2-acrylamido-2-methylpropane sulfonic acid copolymers, polyethyleneimine and the like.

An example of a dispersing agent which can be utilized is comprised of the condensation polymer product of an aliphatic ketone, an aliphatic aldehyde and a compound which introduces acid groups into the polymer, e.g., sodium bisulfite. Such a dispersant is described in U.S. Pat. No. 4,557,763 issued to George et al. on December 10, 1985.

Examples of set accelerating agents which can be utilized include, but are not limited to, calcium chloride, zinc formate and triethanolamine, and examples of formation conditioning agents include, but are not limited to, potassium chloride and sodium chloride.

A method of the present invention for cementing a subterranean zone penetrated by a well bore comprises the steps of:

(a) introducing a crack and shatter resistant cement composition into the zone by way of the well bore, the cement composition comprising a hydraulic cement, sufficient hydrophilic fibers to make the cement composition crack and shatter resistant upon setting and sufficient water to form a pumpable slurry of the cement and fibers; and (b) allowing the cement composition to set in the zone. A more preferred method of cementing a subterranean zone penetrated by a well bore comprises the steps of:

(a) pumping a crack and shatter resistant cement composition into the zone by way of the well bore, the cement composition comprising Portland cement, sufficient hydrophilic polyethylene fibrillated net-shaped fibers to make the cement composition crack and shatter resistant upon setting and sufficient water to form a pumpable slurry of the cement and fibers; and (b) allowing the cement composition to set in the zone. A preferred method of this invention for cementing a pipe string, such as casing or a liner, in a well bore whereby the set cement can withstand the formation of perforations therein as well as other impacts and shocks subsequently generated by drilling or other well operations without cracking or shattering and forming rubble is comprised of the steps of:

(a) pumping a crack and shatter resistant cement composition into the annulus between the pipe string and the walls of the well bore, the cement composition comprising Portland API Class G or H cement, hydrophilic polyethylene fibrillated net- shaped fibers present in an amount in the range of from about 0.125% to about 0.5% by weight of cement in the composition and water present in an amount in the range of from about 38% to about 46% by weight of cement in the composition; and (b) allowing the cement composition to set into a hard crack and shatter resistant impermeable mass having ductility and toughness.

In order to further illustrate the methods of the present invention the following example is given.

EXAMPLE

A base cement composition comprised of Portland API Class H cement and fresh water present in an amount of about 38% by weight of the cement having a density of 16.4 pounds per gallon was prepared. A portion of the base cement composition without fibers as well as portions thereof with hydrophobic polypropylene fibers and hydrophilic polypropylene fibers were tested for mechanical properties in accordance with API RP 10B. The fibers utilized and their quantities along with the results of the tests are set forth in the Table below.

cement and readily dispersed in the mixing water while the hydrophobic fibers were not.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. An improved method of cementing a pipe string in a well bore whereby the set cement can withstand the formation of perforations therein as well as other impacts and shocks subsequently generated by drilling and other well operations without cracking or shattering and forming rubble comprising the steps of:

(a) pumping a cracking and shatter resistant cement composition into the annulus between said pipe string and the walls of said well bore, said cement composition comprising a hydraulic cement, sufficient hydrophilic fibrillated net-shaped fibers to make said cement composition shatter resistant upon setting and sufficient water to form a pumpable slurry of said hydraulic cement and said fibers; and (b) allowing said cement composition to set into a hard crack and shatter resistant impermeable mass having ductility and toughness.

2. The method of claim 1 wherein said hydraulic cement in said composition is selected from the group consisting of Portland cements, pozzolana cements, gypsum cements, slag cements, silica cements and high aluminum content cements.

3. The method of claim 1 wherein said hydraulic cement in said composition is Portland cement.

4. The method of claim 1 wherein said hydrophilic fibers in said composition are polyolefin fibers coated with a hydrophilic surface active agent.

5. The method of claim 4 wherein said polyolefin fibers are selected from the group consisting of polypropylene fibers and polyethylene fibers.

6. The method of claim 1 wherein said hydrophilic fibers are present in said cement composition in an amount in the range of from about 0.1% to about 1% by weight of hydraulic cement in said composition.

TABLE

Mechanical Properties[1] Of Fiber Containing Cement Compositions

| Test No. | Type of Fibers | Quantity of Fibers, % by weight of cement | Compressive Strength, psi | Tensile Strength[2], psi | Plastic Failure Tests | | | Young's Modulus (Ex 10$^6$) | Poisson's Ratio |
| --- | --- | --- | --- | --- | --- | --- | --- | --- | --- |
| | | | | | Unconfined Strength, psi | 1000 psi Confined Strength, psi | Brazilian Tensile Strength, psi | | |
| 1 | None | — | 4120 | 467 | 6910 | 8286 | 292 | 1.91 | 0.193 |
| 2 | Hydrophobic Polypropylene | 0.125 | 3610 | 504 | 6639 | 8541 | 837 | 1.67 | 0.138 |
| 3 | Hydrophobic Polypropylene | 0.25 | 3590 | 512 | 6006 | 7972 | 635 | 1.48 | 0.14 |
| 4 | Hydrophobic Polypropylene | 0.5 | 3760 | 492 | 5523 | 7444 | 645 | 1.47 | 0.11 |
| 5 | Hydrophilic Polypropylene | 0.125 | 3970 | 556 | 5523 | 8605 | 727 | 1.5 | 0.13 |
| 6 | Hydrophilic Polypropylene | 0.25 | 3750 | 493 | 5373 | 7623 | 705 | 1.45 | 0.124 |
| 7 | Hydrophilic Polypropylene | 0.5 | 3280 | 456 | 4933 | 7025 | 669 | 1.53 | 0.117 |

[1]The test samples were cured at 140° F. for 72 hours prior to testing
[2]Briquetts were prepared for tensile strength measurements From the Table it can be seen that the mechanical properties of the test cement portions containing hydrophilic fibers are essentially the same as the test cement portions containing hydrophobic polypropylene fibers. In addition, the hydrophilic fibers were easily dry blended with the 7. The method of claim 1 wherein said water in said composition is selected from the group of fresh water, unsaturated aqueous salt solutions and saturated aqueous salt solutions.

8. The method of claim 1 wherein said water is present in said cement composition in an amount in the range of from about 30% to about 100% by weight of said hydraulic cement in said composition.

9. The method of claim 1 wherein said cement composition further comprises one or more additives selected from the group consisting of set retarding agents, fluid loss control agents, set accelerating agents, dispersing agents and formation conditioning agents.

* * * * *